United States Patent
Yamamoto et al.

(10) Patent No.: US 8,108,983 B2
(45) Date of Patent: Feb. 7, 2012

(54) METHOD OF MANUFACTURING A ROTARY MOTOR

(75) Inventors: Kazuyuki Yamamoto, Tokyo (JP); Koichi Tao, Tokyo (JP); Yuki Fujioka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 12/944,882

(22) Filed: Nov. 12, 2010

(65) Prior Publication Data

US 2011/0094089 A1    Apr. 28, 2011

Related U.S. Application Data

(62) Division of application No. 11/922,723, filed as application No. PCT/JP2005/011341 on Jun. 21, 2005, now Pat. No. 7,859,162.

(51) Int. Cl.
*H02K 15/00* (2006.01)

(52) U.S. Cl. ............ 29/596; 29/507; 29/598; 29/605; 29/606

(58) Field of Classification Search ............ 29/596–598, 29/605, 606, 732, 733, 735; 310/194, 214, 310/216.079, 216.088, 234, 254.1, 269
See application file for complete search history.

(56) References Cited

U.S. PATENT DOCUMENTS

| | | | |
|---|---|---|---|
| 4,837,473 A | 6/1989 | Matuda et al. | |
| 5,400,495 A | 3/1995 | Murai | |
| 5,710,473 A | 1/1998 | Nobe et al. | |
| 6,141,865 A * | 11/2000 | Kakutani et al. | 29/733 |
| 6,573,632 B2 * | 6/2003 | Hsu | 310/254.1 |
| 6,580,193 B2 | 6/2003 | Yoshikawa et al. | |
| 7,285,891 B2 | 10/2007 | Yamamoto et al. | |
| 2002/0130583 A1 | 9/2002 | Moroto et al. | |
| 2003/0201690 A1 | 10/2003 | Mori | |
| 2004/0046479 A1 | 3/2004 | Haga | |
| 2004/0051417 A1 | 3/2004 | Yamazaki et al. | |

(Continued)

FOREIGN PATENT DOCUMENTS

CN    10346220 C    4/1997

(Continued)

OTHER PUBLICATIONS

International Search Report for PCT/JP2005/011341 dated Oct. 4, 2005.

(Continued)

*Primary Examiner* — Thiem Phan
(74) *Attorney, Agent, or Firm* — Buchanan Ingersoll & Rooney PC

(57) ABSTRACT

The disclosure relates to the realization of stable electrical connections between coils and a commutator without causing slackening of the coils wound on individual magnetic teeth. An armature of a rotary motor includes an armature core structured splittably into magnetic tooth members which are individually wound by concentrated-winding type coils, and a commutator having the same number of segments as the number of the magnetic tooth members, the individual segments having connecting terminals, wherein an end portion of the coil concentratedly wound on one of the magnetic tooth members is connected generally in a straight line to the connecting terminal of the segment which is located at a position offset in a circumferential direction by a specific angle from the aforementioned one magnetic tooth member, and a conductor line connected to the connecting terminal of the segment is concentratedly wound on another magnetic tooth member adjacent to the aforementioned one magnetic tooth member.

3 Claims, 22 Drawing Sheets

U.S. PATENT DOCUMENTS

| | | |
|---|---|---|
| 2004/0095036 A1 | 5/2004 | Yamamoto et al. |
| 2004/0124737 A1 | 7/2004 | Yamamoto et al. |
| 2004/0150280 A1 | 8/2004 | Moroto et al. |
| 2004/0263015 A1 | 12/2004 | Okada et al. |
| 2005/0029891 A1 | 2/2005 | Okada et al. |
| 2006/0119207 A1 | 6/2006 | Okada et al. |

FOREIGN PATENT DOCUMENTS

| | | |
|---|---|---|
| CN | 1484883 A | 3/2004 |
| DE | 195 33 029 A1 | 3/1996 |
| DE | 10 2004 003 146 A1 | 9/2004 |
| DE | 10 2004 025 105 A1 | 2/2005 |
| DE | 10 2004 037 866 A1 | 3/2005 |
| JP | 8-84458 | 3/1996 |
| JP | 2002-354733 A | 12/2002 |
| JP | 2003-324927 | 11/2003 |
| JP | 2004-88902 A | 3/2004 |
| JP | 2004-208359 A | 7/2004 |
| JP | 2004-328987 | 11/2004 |
| WO | WO 2005/086318 | 9/2005 |

OTHER PUBLICATIONS

Office Action from German Patent Office issued in corresponding German Patent Application No. 11 2005 003 615.4-32 dated Feb. 1, 2011, with an English translation thereof.

* cited by examiner (a)
(b)

METHOD OF MANUFACTURING A ROTARY MOTOR

This application is a divisional of application Ser. No. 11/922,723, filed Dec. 21, 2007, the contents of which are incorporated herein by reference, which is a National Stage filing under §371 of PCT/JP2005/011341, filed Jun. 21, 2005.

TECHNICAL FIELD

The present invention relates to a structure and a manufacturing method of a rotary motor provided with an armature core and a commutator mounted in close proximity to an axial end of the armature core.

BACKGROUND ART

An armature of a rotary motor described in patent document 1, for example, is provided with a core of which individual magnetic teeth are wound by concentrated-winding type coils and a commutator. The concentrated-winding type coils on the individual magnetic teeth enable reductions in a dimension in an axial direction and in resistance of the windings, thus allowing a compact, low-amperage rotary motor to be configured as compared to an armature with distributed windings.

A method used for increasing conductor packing factor of concentrated-winding type coils is to split a core and wind conductors under conditions where interference between any adjacent magnetic teeth is avoided. A method used in document 1 mentioned above is to split a core having a plurality of magnetic teeth into a first core portion and a second core portion. Used in document 2 is a method in which a core unit is made up of separate members, that is, a plurality of coil cores and a center core, and the coil cores and the center core are joined with recesses and protrusions thereof fitted together after coils are wound on coil-winding portions of the coil cores. Additionally, referring to document 3, inventors invented a core shape in which each magnetic tooth can be pulled outward to such an extent that winding operation is possible without causing interference between adjacent magnetic teeth. The structure of document 3 has an advantage that split magnetic teeth can be united to form a single body by force-fitting a rotary shaft into a hole in a back yoke portion of each of the magnetic teeth which are alternately overlapped upon completion of conductor winding on all of the magnetic teeth.

Patent document 1: Japanese Patent Application Publication No. 2004-88902 (paragraph 0024)
Patent document 2: Japanese Patent Application Publication No. 2004-328987 (FIG. 4)
Patent document 3: Japanese Patent Application Publication No. 2004-208359 (FIGS. 1 to 8)

DISCLOSURE OF THE INVENTION

Problems to be Solved by the Invention

In the case of an armature of a rotary motor having a commutator, it is necessary to electrically connect each connecting terminal of the commutator to an end of a coil. In the example of the aforementioned document 1, for instance, coil ends are once fixedly retained on an insulator after a coil has been wound on each magnetic tooth and, then, the aforementioned coil ends are connected to connecting terminals of a commutator upon joining the first and second core portions. This method has a problem that the fixedly retained coils are not set at fixed positions so that it is difficult to connect the coils to the connecting terminals of the commutator, especially when the coils are thin.

Another possible method would be to conductively connect the coils to metallic terminals provided on an insulator by a fusing technique, for instance, and then connect the metallic terminals with connecting terminals of a commutator in separate steps as shown in the aforementioned document 2. This method, however, would cause a cost increase by as much as the amount of increase in the number of components and processes. Also, since the coils are cut into segmental units for individual magnetic teeth, the number of joints increases, resulting in increases in cost of connecting terminal components and the amount of labor required for connecting processes. Thus, cost required for connecting the coils increases, making it impossible to lower overall cost of the rotary motor. Additionally, this method has a problem that the dimension of the armature along the axial direction increases by as much as a structure of the connecting terminals.

According to a core structure of document 3 proposed by the inventors, winding operation is carried out with a commutator placed at a position close to the core in an axial direction thereof, in which a conductor is wound in a concentrated fashion on one magnetic tooth pulled outward in a radial direction, and with a winding once hooked onto a connecting terminal, the conductor is wound in succession on a next magnetic tooth, whereby the conductor can be wound at high density without any cut to make concentrated-winding type coils on all of the magnetic teeth. Upon completion of the winding operation, portions of the windings hooked onto the connecting terminals are conductively connected thereto by fusing, whereby the commutator and the windings can be electrically interconnected.

This operation for pulling out and returning the magnetic teeth along the radial direction, however, causes slackening of the windings and, as a consequence, such problems would occur that the slacked windings come off slots while turning or the windings hooked onto the connecting terminals become unhooked before fusing operation, making it impossible to electrically connect the windings to the commutator in a stable manner.

The present invention is proposed to overcome the aforementioned problems and has as an object the realization of stable electrical connections between coils and a commutator without causing slackening of the coils wound on individual magnetic teeth.

Means for Solving the Problems

An armature of a rotary motor according to this invention includes an armature core structured splittably into magnetic tooth members which are individually wound by concentrated-winding type coils, and a commutator having the same number of segments as the number of the magnetic tooth members and connecting terminals by which the coils wound on the aforementioned magnetic tooth members are connected to the individual segments. An end portion of the coil concentratedly wound on one of the magnetic tooth members is connected generally in a straight line to the connecting terminal of the segment which is located at a position offset in a circumferential direction by a specific angle from the aforementioned one magnetic tooth member, and a conductor line connected to the connecting terminal of the segment is concentratedly wound on another magnetic tooth member adjacent to the aforementioned one magnetic tooth member.

A method of manufacturing a rotary motor according to this invention includes a step of winding a conductor line on an armature core by sequentially repeating a first step of pulling out one of magnetic tooth members of the armature core in a radial direction, the armature core being splittable into the individual magnetic tooth members, and forming a concentrated-winding type coil on the one magnetic tooth member, a second step of pushing back the one magnetic tooth member into position and connecting an end portion of the concentrated-winding type coil to a connecting terminal of a commutator which has the same number of segments as the number of the magnetic tooth members, and a third step of winding the conductor line connected to the connecting terminal of the segment on another magnetic tooth member adjacent to the one magnetic tooth member to form another concentrated-winding type coil. Then, a step of relatively turning the armature core and the commutator by a specific angle to shape the conductor line interconnecting the end portion of the concentrated-winding type coil on each of the magnetic tooth members and the connecting terminal of the segment generally into a straight line and fixing a rotary shaft to the armature core and the commutator is executed.

Advantageous Effects of the Invention

According to this invention, the conductor line connecting the coil wound on each magnetic tooth member to the connecting terminal of each segment of the commutator does not slacken and the coil does not come off slots while the rotary motor is running. Also, the conductor line hooked onto each connecting terminal of the commutator does not become unhooked before the conductor line is fixed, so that it is possible to establish stable electrical connections between the commutator and armature coils.

BEST MODES FOR CARRYING OUT THE INVENTION

Now, best modes for carrying out the present invention are described in the following with reference to the drawings.

First Embodiment

FIG. 1 is a diagram showing an armature of a rotary motor according to a first embodiment of the present invention, in which FIG. 1(a) is a cross-sectional front view, FIG. 1(b) is a left side view, FIG. 1(c) is a right side view, and FIG. 1(d) is a cross-sectional view taken along lines d-d of FIG. 1(a). A stator disposed around an outer periphery of the armature is shown only in FIG. 1(d).

The rotary motor of this embodiment is provided with an armature core 10 affixed onto a rotary shaft 30 and a flat-type commutator 20 which is also affixed onto the rotary shaft 30 in close proximity to an axial end of the armature core 10. As will be later discussed in detail, the armature core 10 is built up of magnetic tooth members 2 which are separable into units of magnetic teeth, with concentrated-winding type coils 12 wound around the individual magnetic tooth members 2. The flat-type commutator 20 has the same number (six in the present example) of segments 21 constructed of conductor pieces made of copper, for instance, as the number of the magnetic teeth of the armature core 10. The individual segments 21 are insulated from one another by grooves 22 and brushes (not shown) come in contact with the segments 21 from an axial direction. Also, each of the segments 21 is provided with a connecting terminal 25 in an outer radial direction for establishing connection to the coils 12 wound on the magnetic tooth member 2. Further, the commutator 20 is provided with a boss portion 26 made of resin for fixing the individual segments 21, the boss portion 26 having a hole in which the rotary shaft 30 is fitted. Also, as shown in FIG. 1(d), there is provided the stator 40 on the outer periphery of the armature core 10, with permanent magnets 41 disposed at specific positions along a circumferential direction of the armature core 10.

FIG. 2 is a perspective view showing the structure of the armature core of FIG. 1, FIG. 3 is an exploded perspective view showing the armature core of FIG. 2, FIG. 4 is a perspective view showing a condition in which one of the magnetic tooth members of the armature core of FIG. 2 is pulled out, FIG. 5 is a plan view showing the armature core of FIG. 2, and FIG. 6 is a cross-sectional view showing a cross section taken along a line VI-VI of FIG. 5.

As shown in FIG. 2, the armature core 10 of the first embodiment is configured by combining a plurality (six in the present example) of magnetic tooth members 2 centered radially around a back yoke portion 11 having a through hole 7. As shown in FIG. 3, each of the magnetic tooth members 2 includes first sheet elements 6 and at least one second sheet element 8 inserted between any two adjacent first sheet elements 6 in a laminating direction thereof at a location different from the locations of the other magnetic tooth members 2. The first sheet elements 6 each have a magnetic tooth 3 formed at one end and a basal part 5 formed at the other end with an end face 4 of the basal part 5 having a prescribed external shape (arch shape as illustrated). The second sheet element 8 has a magnetic tooth 3 formed at one end and an overlapping part 9 formed at the other end with the through hole 7 formed at a specified position in the overlapping parts 9, the overlapping part 9 forming the back yoke portion 11 together with the basal parts 5 of the first sheet elements 6.

The individual magnetic tooth members 2 structured as described above are fixedly combined into a single body by crimping the magnetic tooth members 2 at specified locations marked by asterisks (*) in FIGS. 5 and 6. Next, the magnetic tooth members 2 are combined in a radial form in such a way that the through holes 7 in the individual overlapping parts 9 are aligned with one another, and end faces of the individual overlapping parts 9 fit against the end faces 4 of the basal parts 5 of the other magnetic tooth members 2 as shown in FIGS. 3 and 4.

The armature core 10 of the present embodiment is constructed by combining the individual magnetic tooth members 2 in a radial form centering on a side thereof where the overlapping parts 9 are formed such that the individual through holes 7 in the overlapping parts 9 are aligned with one another as mentioned above, and forcibly fitting the rotary shaft 30 into the individual through holes 7 to fixedly join the magnetic tooth members 2 into a single body. Then, insulators 13 for insulation between the coils and the core are fitted on the individual magnetic teeth 3 in a manner that makes it possible to pull out each magnetic tooth member 2 together with the insulator 13 in a radial direction at the time of assembly of the armature core 10.

Next, winding and assembly processes of the armature of the rotary motor according to the first embodiment of this invention are described in succession with reference to FIGS. 7 to 15. In FIGS. 7 to 15, (a) designates cross-sectional front views and (b) designates side views.

As shown in FIGS. 7 to 15, operation for winding a conductor on the armature core 10 is performed under conditions where the commutator 20 is positioned in close proximity to the armature core 10 in an axial direction thereof with a central axis of the armature core 10 and that of the commutator 20 arranged in line. First, a magnetic tooth member 2A is pulled outward in the radial direction thereof under conditions where the overlapping part 9 of the magnetic tooth member 2A is overlapped with the other overlapping parts 9 in the laminating direction as shown in FIG. 7. Then, the conductor is wound on the magnetic tooth member 2A by means of a winding machine 60. Since the winding operation by the winding machine 60 does not cause any interference with the adjacent magnetic tooth members 2, the magnetic tooth member 2A is wound by a concentrated-winding type coil 12A at high density.

Next, the magnetic tooth member 2A which was pulled outward is pushed back along the radial direction as shown in FIG. 8. Since the overlapping part 9 of the magnetic tooth member 2A is overlapped with the other overlapping parts 9, it is possible to smoothly push back the magnetic tooth member 2A. Then, a winding end portion of the coil 12A concentratedly wound on the magnetic tooth member 2A is hooked onto a connecting terminal 25a of the commutator 20 which is located at a position separated in an axial direction of the magnetic tooth member 2A as shown in FIG. 9.

Subsequently, the armature core 10 and the commutator 20 are turned by 60 degrees around the central axis thereof as shown in FIG. 10. Then, another magnetic tooth member 2B which is adjacent to the magnetic tooth member 2A is pulled outward in the radial direction thereof under conditions where the overlapping part 9 of the magnetic tooth member 2B is overlapped with the other overlapping parts 9 in the laminating direction. Further, the winding conductor hooked onto the connecting terminal 25a is guided to a winding start position of the magnetic tooth member 2B, and the conductor is wound on the magnetic tooth member 2B by the winding machine 60 as shown in FIG. 11. Since the winding operation by the winding machine 60 does not cause any interference with the adjacent magnetic tooth members 2, the magnetic tooth member 2B is wound by a concentrated-winding type coil 12B at high density.

After the concentrated-winding type coil 12B has been wound on the magnetic tooth member 2B, the magnetic tooth member 2B is pushed back along the radial direction. Since the overlapping part 9 of the magnetic tooth member 2B is overlapped with the other overlapping parts 9, it is possible to smoothly push back the magnetic tooth member 2B. Then, a winding end portion of the coil 12B concentratedly wound on the magnetic tooth member 2B is hooked onto a connecting terminal 25b of the commutator 20 which is located at a position separated in an axial direction of the magnetic tooth member 2B.

Thereafter, the concentrated-winding type coils 12 are successively wound on the adjacent magnetic tooth members 2 while hooking winding end portions of the coils 12 onto connecting terminals 25 of the commutator 20 in a similar way, whereby winding on all the magnetic tooth members 2 is completed as shown in FIG. 12.

Upon completion of winding on all the magnetic tooth members 2, the commutator 20 is turned about the axis thereof such that the position of the commutator 20 and that of the magnetic tooth members 2 in a circumferential direction are offset from each other. As an example, the commutator 20 is turned about the axis thereof such that the connecting terminal 25b of the commutator 20 is positioned in the axial direction of the magnetic tooth member 2A as shown in FIG. 13. Turning the commutator 20 this way makes it possible to stretch a conductor line which has slackened in the above-described process of conductor winding on the magnetic tooth members 2 into a straight form.

Subsequently, the rotary shaft 30 is forcibly fitted and fixed in the through holes 7 in the magnetic tooth members 2 and in the boss portion 26 of the commutator 20 as shown in FIG. 14.

Then, the connecting terminals 25 of the commutator 20 are conductively connected to the coils as shown in FIG. 15 by performing fusing (fusing welder) on the connecting terminals 25 of the commutator 20.

FIG. 16 is a connection diagram of the coils connected to the armature core 10 and the commutator 20 according to the first embodiment of this invention. In this Figure, shown by 2A to 2F are the individual magnetic tooth members, shown by 12A to 12F are the concentrated-winding type coils wound on the individual magnetic tooth members, shown by 21a to 21f are the individual segments of the commutator, and shown by 50 are the brushes. If wirings electrically interconnecting the oppositely situated segments 21b and 21e, 21c and 21f, and 21d and 21a are made inside the commutator 20, the number of brushes is two and, then, shown in the connection diagram of this embodiment is a parallel delta connection circuit in which the oppositely positioned concentrated-winding type coils 12A and 12D, 12B and 12E, and 12C and 12F are parallel-connected respectively as depicted in FIG. 17.

As thus far described, the end portion of the coil 12A concentratedly wound on the magnetic tooth member 2A is connected generally in a straight line to the connecting terminal 25A of the segment 21A which is located at a position offset by a specific angle from the magnetic tooth member 2A and the conductor line connected to the connecting terminal 25A of the segment 21A is concentratedly wound on the magnetic tooth member 2B adjacent to the segment 21A. It is therefore possible to establish stable electrical connections between the commutator 20 and the armature coils without causing the coils to come off slots while the rotary motor is running or the conductor line hooked onto the connecting terminals 25 of the commutator 20 to become unhooked before fusing according to the present embodiment.

Also, according to the present embodiment, there are provided a step of winding a conductor line on the armature core 10 by sequentially repeating a first step of pulling out one magnetic tooth member 2A of the armature core 10 in the radial direction, the armature core 10 being splittable into the individual magnetic tooth members 2, and forming the concentrated-winding type coil 12A on the one magnetic tooth member 2A, a second step of pushing back the one magnetic tooth member 2A into position and connecting the end portion of the concentrated-winding type coil 12A to the connecting terminal 25A of one segment 21A of the commutator 20, and a third step of winding the conductor line connected to the connecting terminal 25A of the segment 21A on the magnetic tooth member 2B adjacent to the one magnetic tooth member 2A in a concentrated fashion, and a step of relatively turning the armature core 10 and the commutator 20 by a specific angle to shape the conductor line interconnecting the end portion of the concentrated-winding type coil 12 on each magnetic tooth member 2 and the connecting terminal 25 of each segment 21 generally into a straight line and fixing the rotary shaft to the armature core 10 and the commutator 20. It is therefore possible to stretch the conductor line which has slackened halfway during the winding process and establish stable electrical connections between the commutator 20 and the armature coils without causing the coils to come off slots while the rotary motor is running or the conductor line hooked onto the connecting terminals 25 of the commutator 20 to become unhooked before fusing.

Also, according to the present embodiment, as the concentrated-winding type coils 12 wound on the magnetic tooth members 2 are connected to configure a delta connection, it is made unnecessary to cut the coils halfway and make connections to a neutral point necessary in a star connection. This means that terminals necessary for the neutral point connections and an extra process of cutting and connecting the coils can be eliminated, thus making it possible to obtain a low-cost, compact rotary motor.

Also, the conductor line is wound on the armature core 10 under conditions where the central axis of the armature core 10 and that of the commutator 20 are arranged in line, thereby permitting smooth execution of the operation for winding the conductor on the armature core 10 and operation for connecting the conductor to the connecting terminals 25 of the commutator 20.

Second Embodiment

In the above-described process of conductor winding on the armature core of the first embodiment, the winding machine 60 performs operation for guiding the winding conductor hooked onto the connecting terminal 25a to the winding start position of the magnetic tooth member 2B. What is essential for achieving a stable, high conductor packing factor with no irregularity in concentrated winding is to guide a first turn of the winding conductor to the winding start position at a margin of a winding area of the magnetic tooth member in a reliable fashion.

The present embodiment is characterized in that, in a structure of an insulator 13 fitted on each magnetic tooth member 2, there is provided a guiding groove 15 for guiding the conductor on a commutator side end face of the insulator 13 at an inner side of each magnetic tooth member 2.

FIG. 18 is a perspective view showing the structure of the insulators to be mounted on the armature core and winding conductor guiding operation according to the second embodiment of the present invention. The insulators 13 are fitted on the individual magnetic tooth members 2, in which a pair of projecting parts 14 is formed along the radial direction at a commutator side end of each insulator 13 at an inner side thereof and the guiding groove 15 is formed between the paired projecting parts 14. It becomes possible to guide the winding conductor to the winding start position at the margin of the winding area of each magnetic tooth member 2 in a reliable fashion by causing the winding machine 60 to perform operation for passing the winding conductor through the guiding groove 15 as shown in FIGS. 18(b) and (c), so that a stable, high conductor packing factor with no irregularity in concentrated winding can be achieved. Since the structure and operation of this embodiment are otherwise the same as those described in the first embodiment, such part of the embodiment is not explained here.

Also, in a process of pushing back the magnetic tooth member 2 after forming the concentrated-winding type coil 12 on the magnetic tooth member 2 as shown in FIG. 8, there can arise a problem that the winding conductor passed through the guiding groove 15 of the insulator 13 slackens and goes into contact with an exposed portion of the core one of which magnetic tooth members 2 has been pulled out, causing breakage of coating on the winding conductor and a resultant inability to maintain insulation from the core (refer to FIGS. 19(a) and 19(b)). To avoid this problem, there is formed a slope rising from outside to inside in a guiding groove 16 of each insulator 13 as shown in FIG. 20. With the provision of this slope, it is possible to prevent the winding conductor run between a connecting terminal 25 of the commutator 20 and the winding start position from moving in a direction where the winding conductor goes into contact with an end face portion of the core when the magnetic tooth member 2 is pushed back to an original position thereof.

Further, it is possible to completely prevent the winding conductor run between the connecting terminal of the commutator and the winding start position from going into contact with the end face portion of the core by employing a structure in which a curved inner surface 17 of each insulator 13 fits on an outer periphery of the boss portion 26 of the commutator 20 under conditions where all the magnetic tooth members 2 have been pushed back into position as shown in FIG. 21.

Third Embodiment

If the central axis of the commutator 20 and that of the armature core 10 are arranged in line as shown in the aforementioned embodiments when the conductor is wound on an armature core of a rotary motor having a commutator with a larger diameter, there can occur a case in which the commutator 20 interferes with winding operation in a case where the conductor is wound in a concentrated fashion down to the bottom of slots due to limitations in the amount of pulling out the magnetic tooth members 2.

According to the present embodiment, the conductor line is wound on the armature core 10 with the central axis of the commutator 20 offset from that of the armature core 10 in a direction opposite to a magnetic tooth member 2 on which the conductor line is currently wound as shown in FIG. 22 so that the conductor line can be wound in a concentrated fashion without hindrance down to a curved inner part of a slot in the magnetic tooth member 2 pulled out. Then, after aligning the central axis of the commutator 20 with that of the armature core 10 upon completion of the conductor winding operation, the commutator 20 is turned by a specific angle to remove slack in the conductor line as discussed in the foregoing embodiments and the rotary shaft 30 is forcibly fitted and fixed in position. As a result, it is possible to wind the conductor in a concentrated fashion even on the armature core of a rotary motor having a commutator with a larger diameter.

Fourth Embodiment

In the foregoing embodiments, the magnetic tooth members 2 of the armature core 10 are each configured by laminating the first sheet elements 6 each of which has the magnetic tooth 3 formed at one end and the basal part 5 of a specific shape formed at the other end and the second sheet elements 8 each of which has the magnetic tooth 3 formed at one end and the overlapping part 9 formed at the other end in which the through hole 7 is formed, the overlapping part 9 forming the back yoke portion 11 together with the basal parts 5 of the first sheet elements 6, as shown in FIGS. 2 and 3. The magnetic tooth member 2 of the armature core 10, however, is not limited to the above-described shape but may be structured in any form splittable into individual magnetic tooth members. For example, the armature core may be structured by combining magnetic tooth members 80 formed by laminating a plurality of sheet elements each having a pair of intermeshable recess 81 and projection 82 formed at a basal side of a magnetic tooth as shown in FIG. 23(a). Also, the armature core 10 may be structured by combining a plurality of magnetic tooth members 90 each having a projection 91 at an innermost side and a back yoke portion 95 having recesses 96 each of which fits on the aforementioned projection 91. When winding a conductor on the individual magnetic tooth members 80 and 90 of FIGS. 23(a) and (b), respectively, the magnetic tooth members 80 and 90 are pulled out in a radial direction by an unillustrated jig and, while keeping the magnetic tooth members 80 and 90 in this condition, the conductor is wound thereon in a concentrated fashion. Then, upon completion of the conductor winding operation, the relevant magnetic tooth members 80 and 90 are pushed back along the radial direction and combined with the recesses 81 fitted on the projections 82, and recesses 96 fitted on the projections 91.

INDUSTRIAL APPLICABILITY

The present invention is generally applicable to a rotary motor provided with an armature core mounted on a rotary shaft and a commutator mounted in close proximity to an axial end of the armature core. More particularly, the invention is applicable to a structure of an armature of which individual magnetic tooth members are wound by concentrated-winding type coils, as well as to this kind of conductor winding method and assembly method.

DESCRIPTION OF THE SYMBOLS

Figure 1:
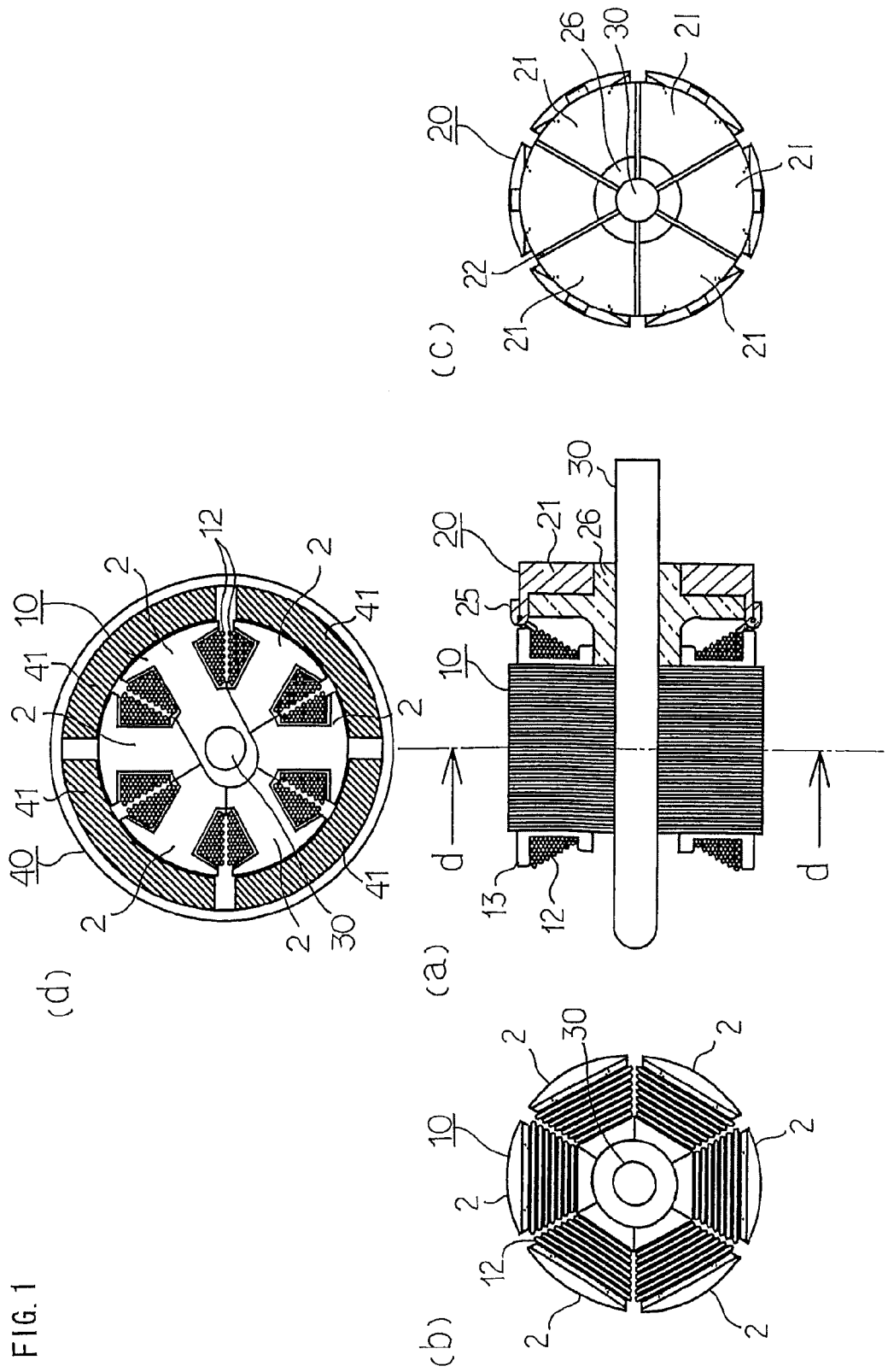
FIG. 1 is a diagram showing an armature of a rotary motor according to a first embodiment of the present invention.
Figure 2:
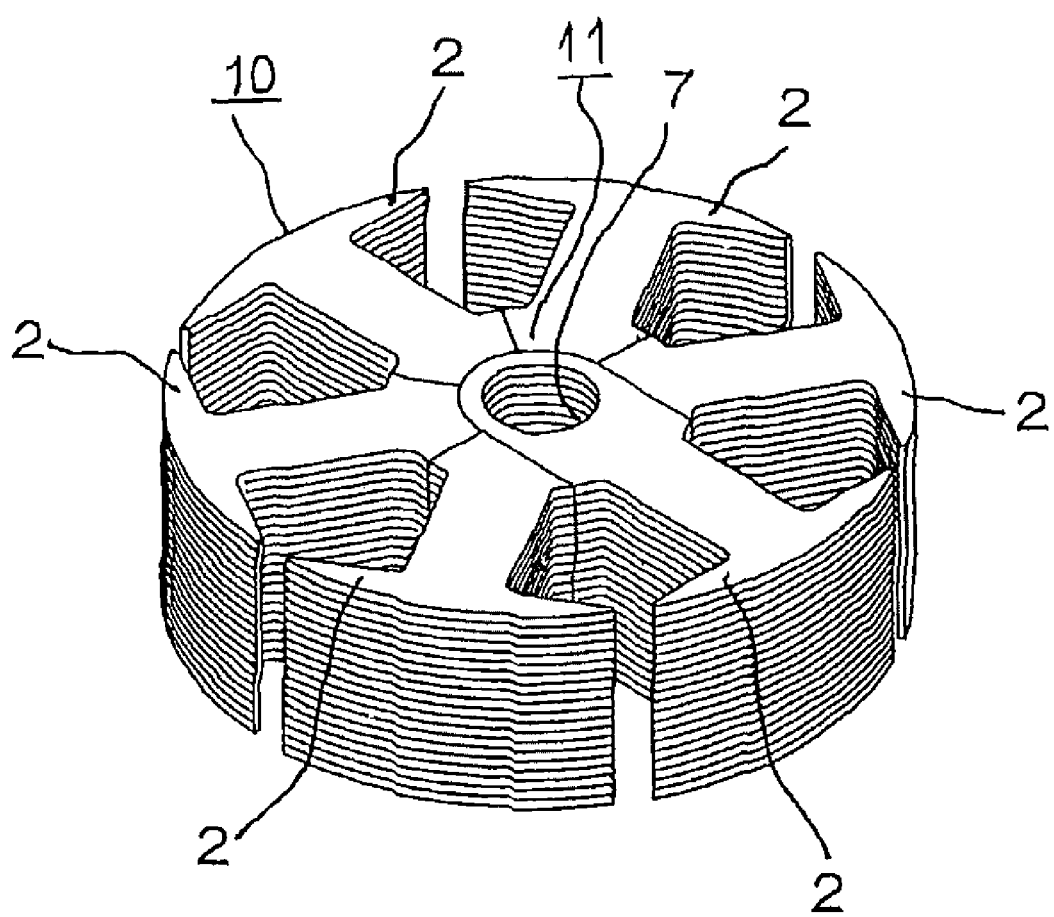
FIG. 2 is a perspective view showing the structure of an armature core according to the first embodiment of the present invention.
Figure 3:
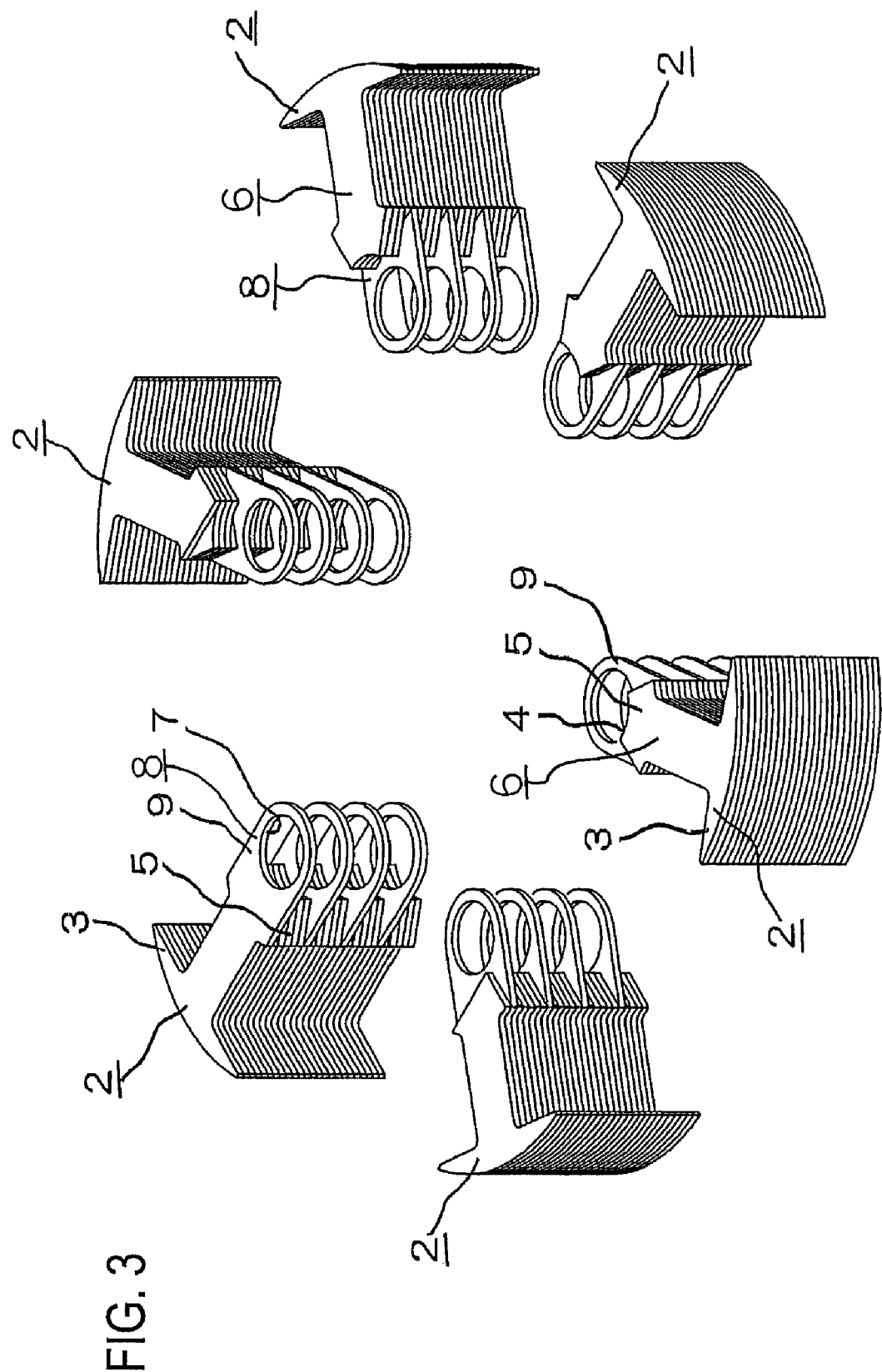
FIG. 3 is an exploded perspective view showing the armature core according to the first embodiment of the present invention.
Figure 4:
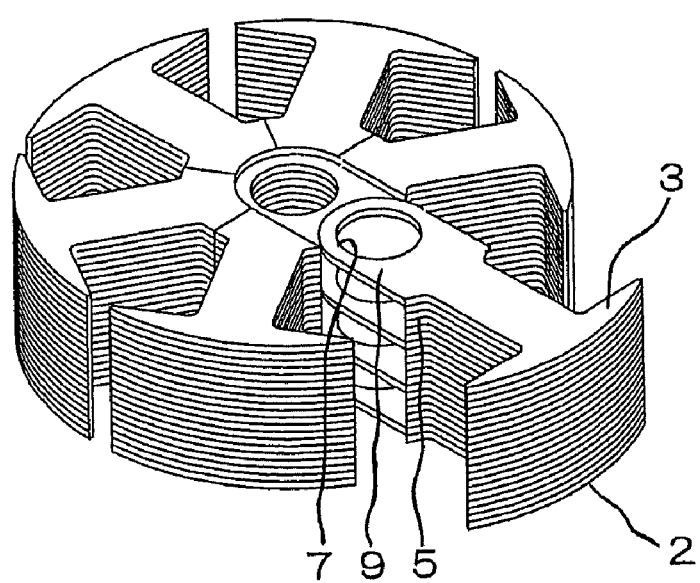
FIG. 4 is a perspective view showing a condition in which one of magnetic tooth members of the armature core of the first embodiment of the present invention is pulled out.
Figure 5:
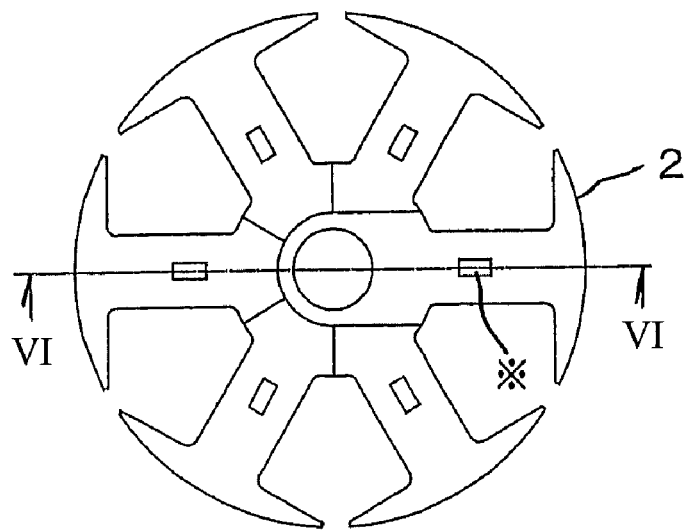
FIG. 5 is a plan view showing the armature core of the first embodiment of the present invention.
Figure 6:
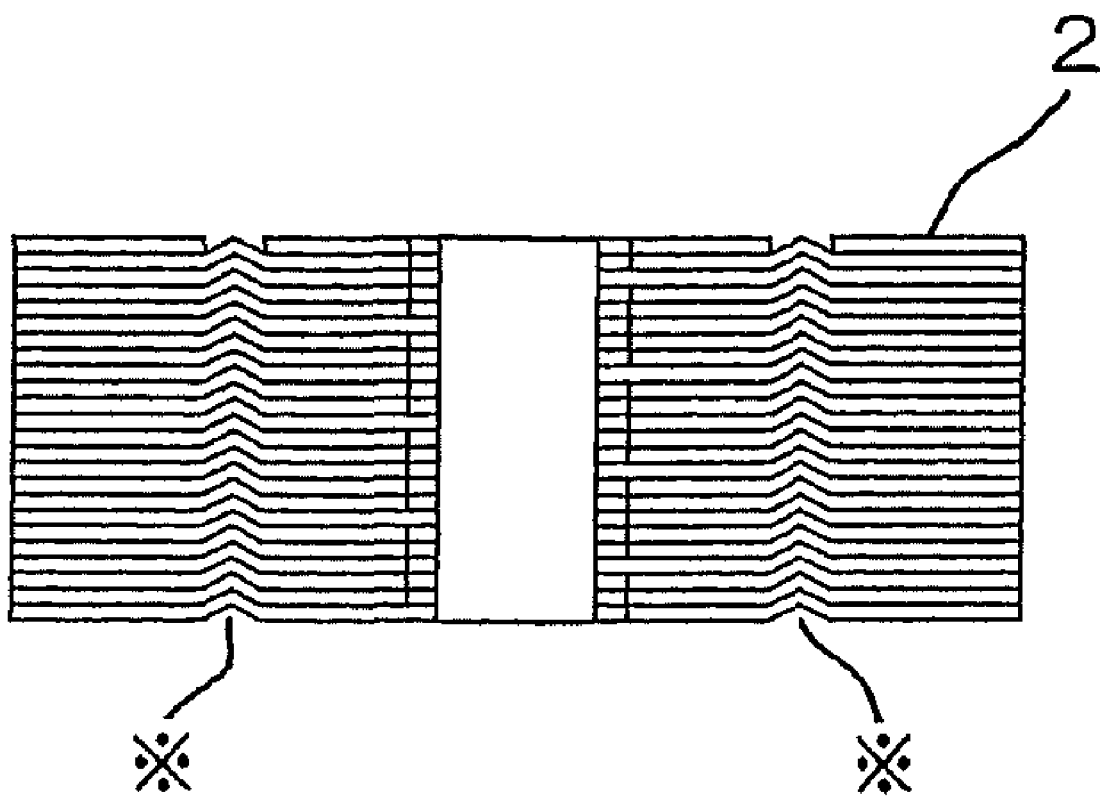
FIG. 6 is a cross-sectional view showing a cross section taken along a line V-V of FIG. 5.
Figure 7:
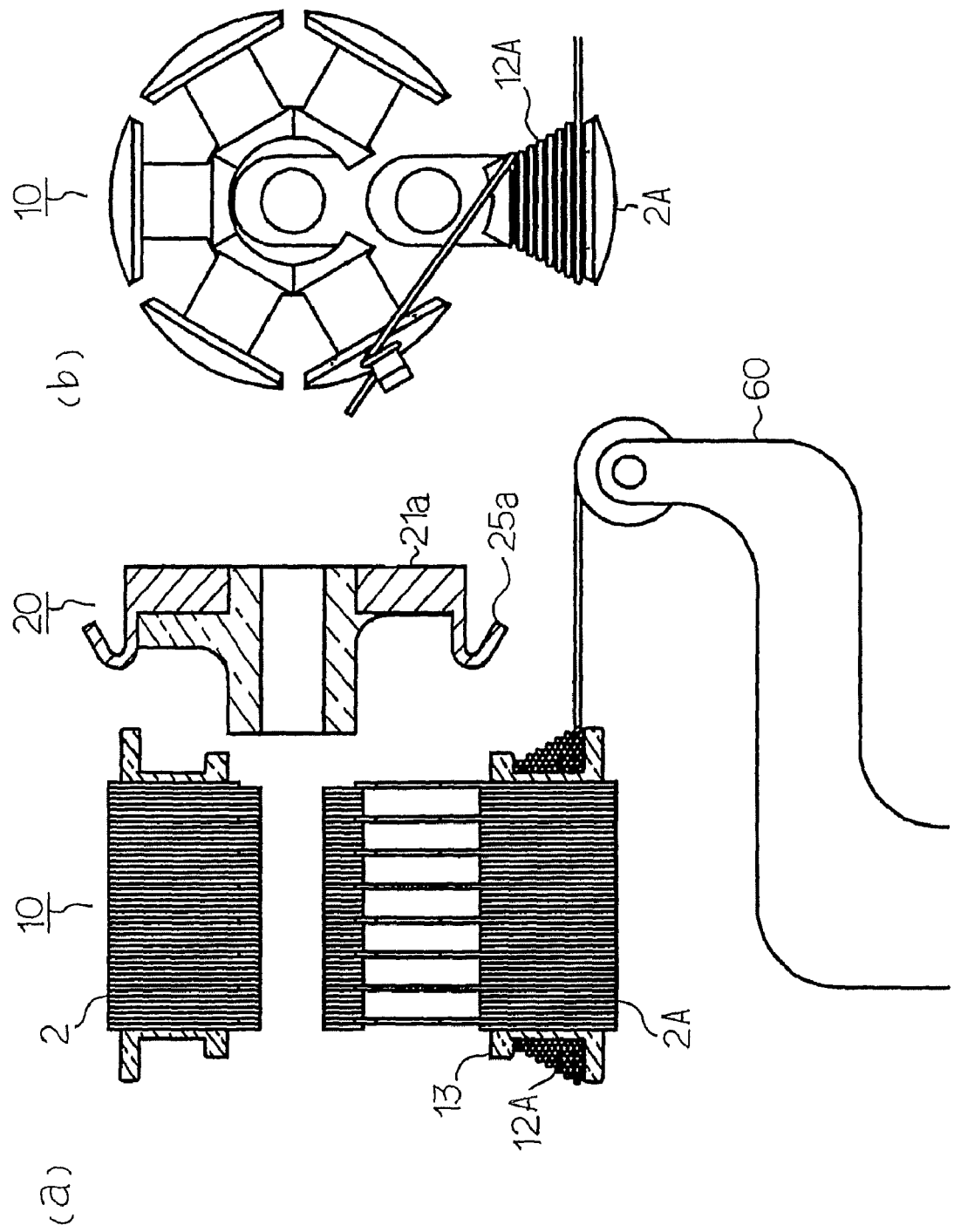
FIG. 7 is a cross-sectional front view (a) associated with a side view (b) showing winding and assembly processes of the armature of the rotary motor according to the first embodiment of this invention.
Figure 8:
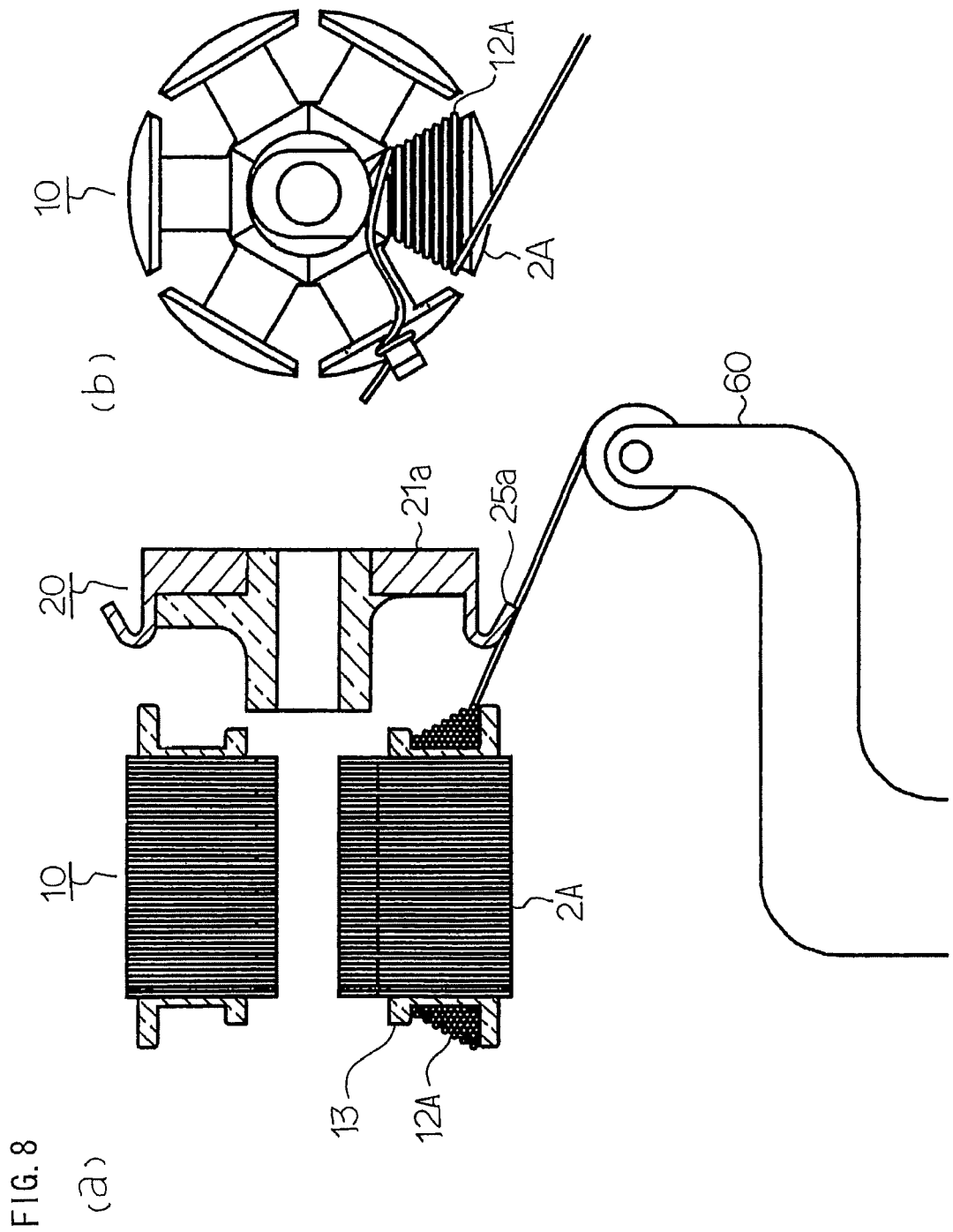
FIG. 8 is a cross-sectional front view (a) associated with a side view (b) showing the winding and assembly processes of the armature of the rotary motor according to the first embodiment of this invention.
Figure 9:
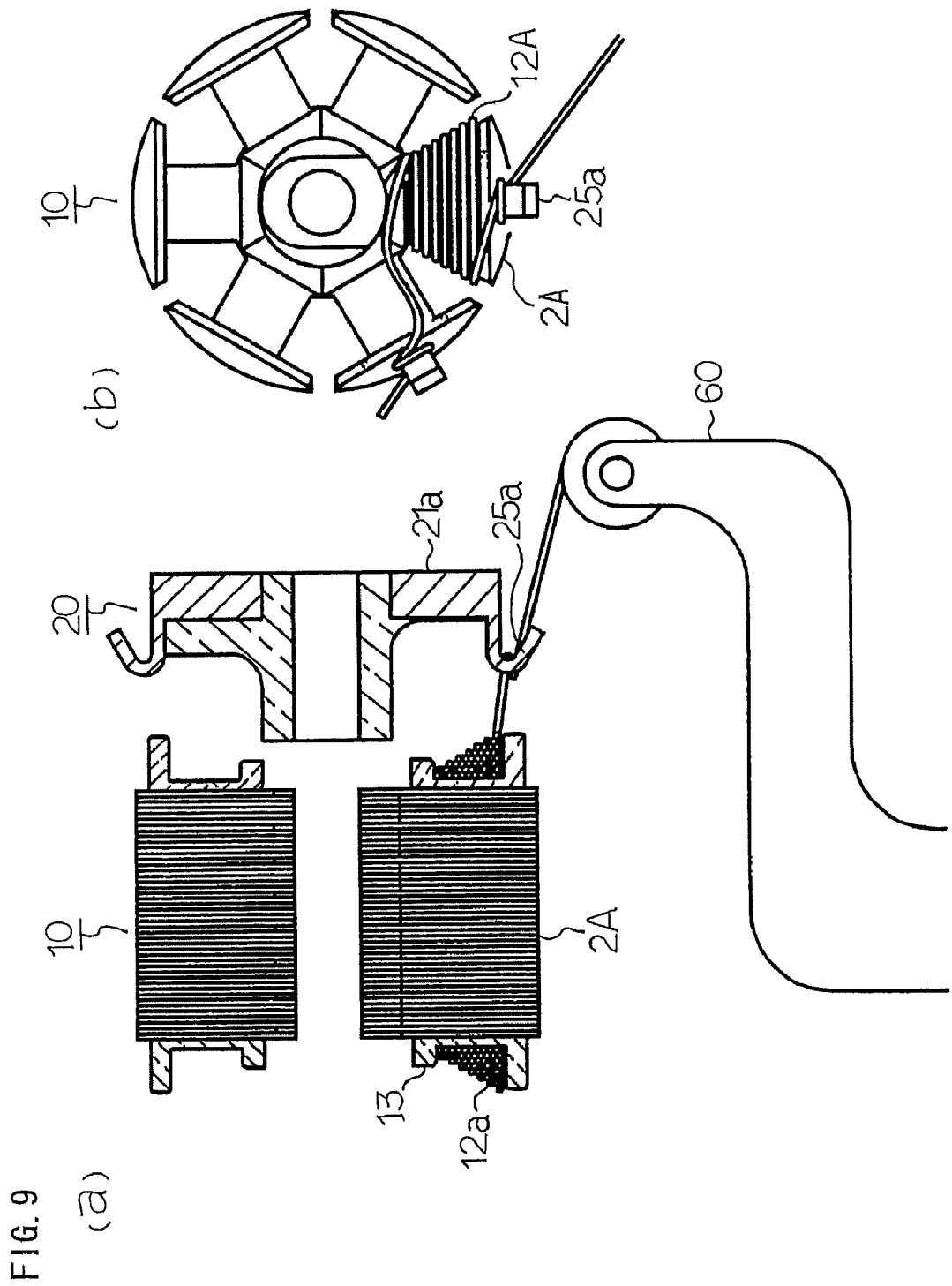
FIG. 9 is a cross-sectional front view (a) associated with a side view (b) showing the winding and assembly processes of the armature of the rotary motor according to the first embodiment of this invention.
Figure 10:
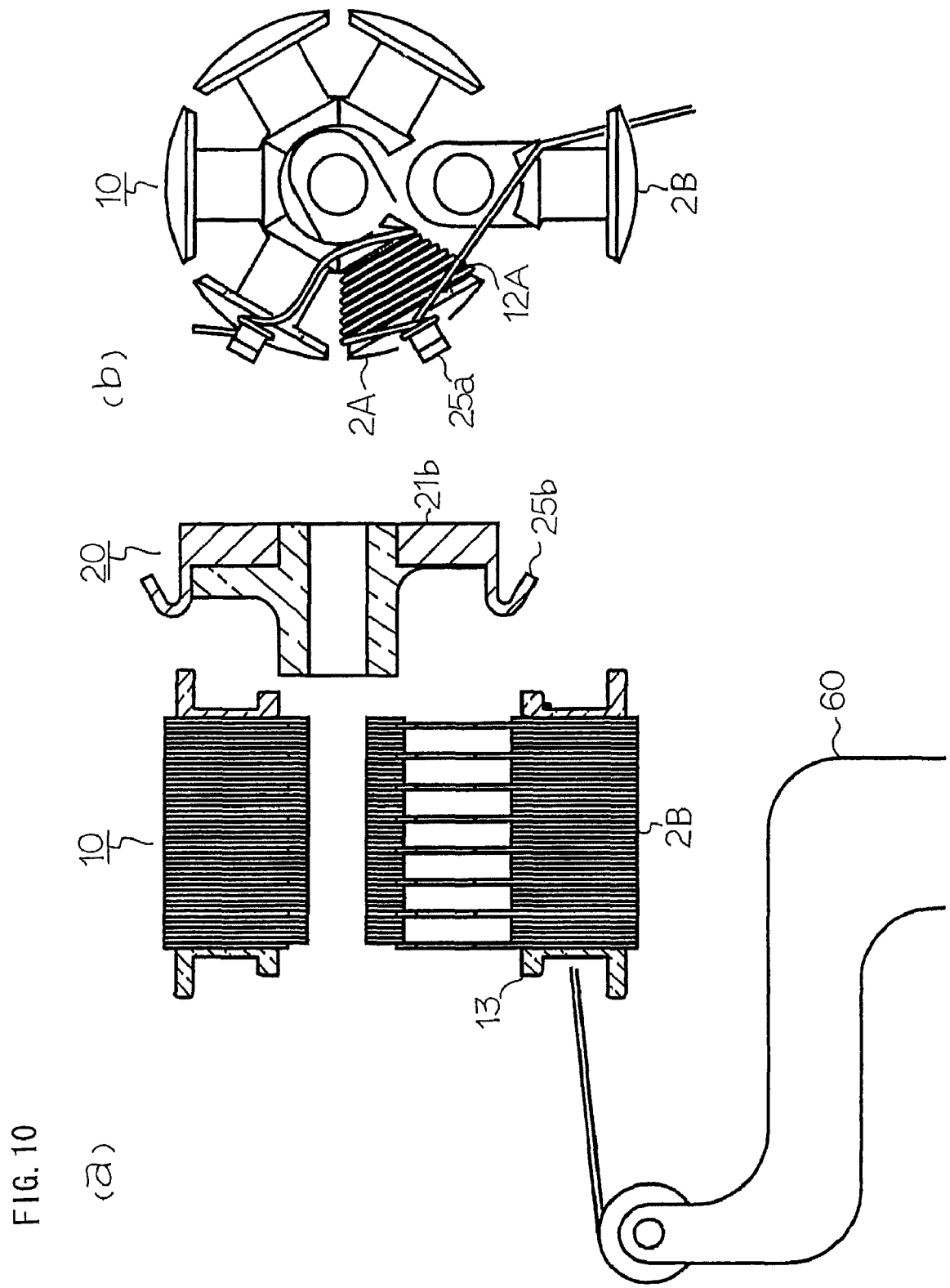
FIG. 10 is a cross-sectional front view (a) associated with a side view (b) showing the winding and assembly processes of the armature of the rotary motor according to the first embodiment of this invention.
Figure 11:
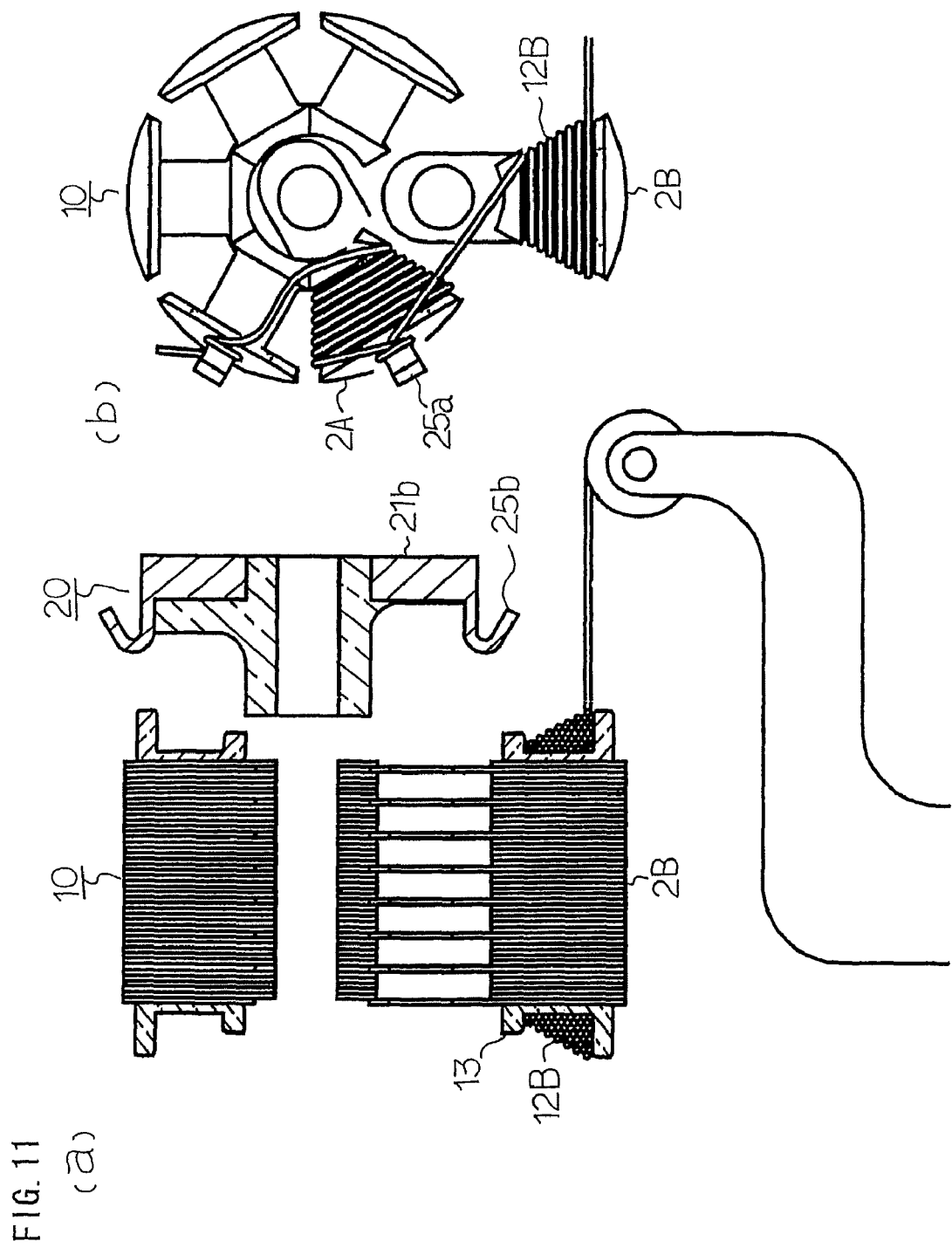
FIG. 11 is a cross-sectional front view (a) associated with a side view (b) showing the winding and assembly processes of the armature of the rotary motor according to the first embodiment of this invention.
Figure 12:
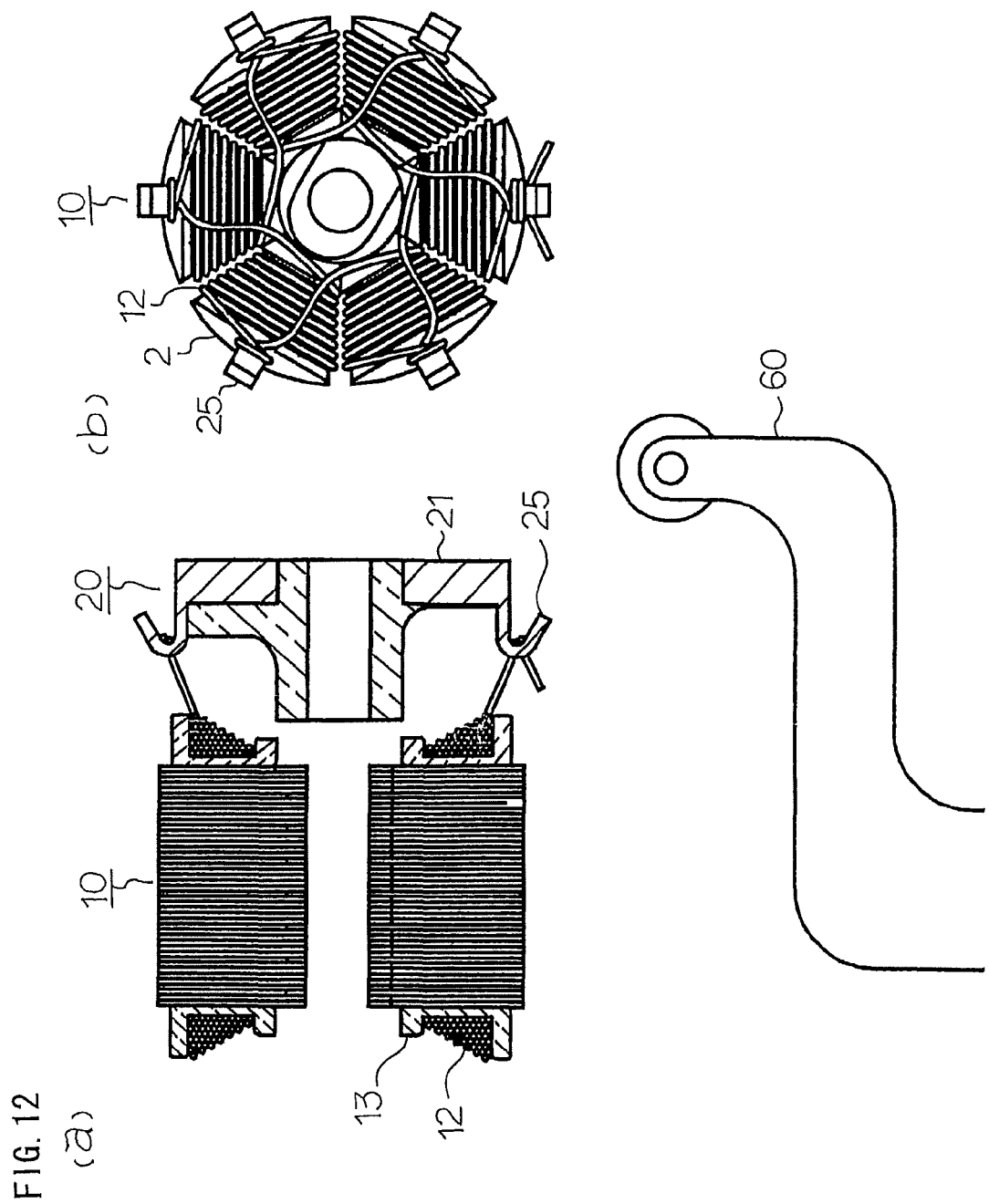
FIG. 12 is a cross-sectional front view (a) associated with a side view (b) showing the winding and assembly processes of the armature of the rotary motor according to the first embodiment of this invention.
Figure 13:
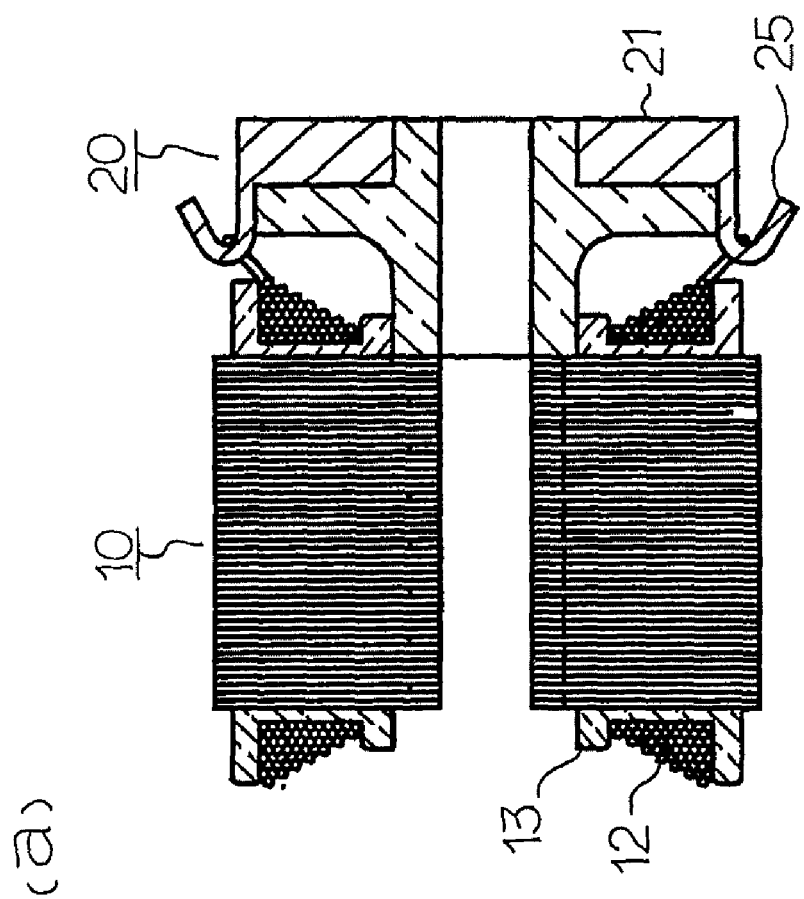
FIG. 13 is a cross-sectional front view (a) associated with a side view (b) showing the winding and assembly processes of the armature of the rotary motor according to the first embodiment of this invention.
Figure 14:
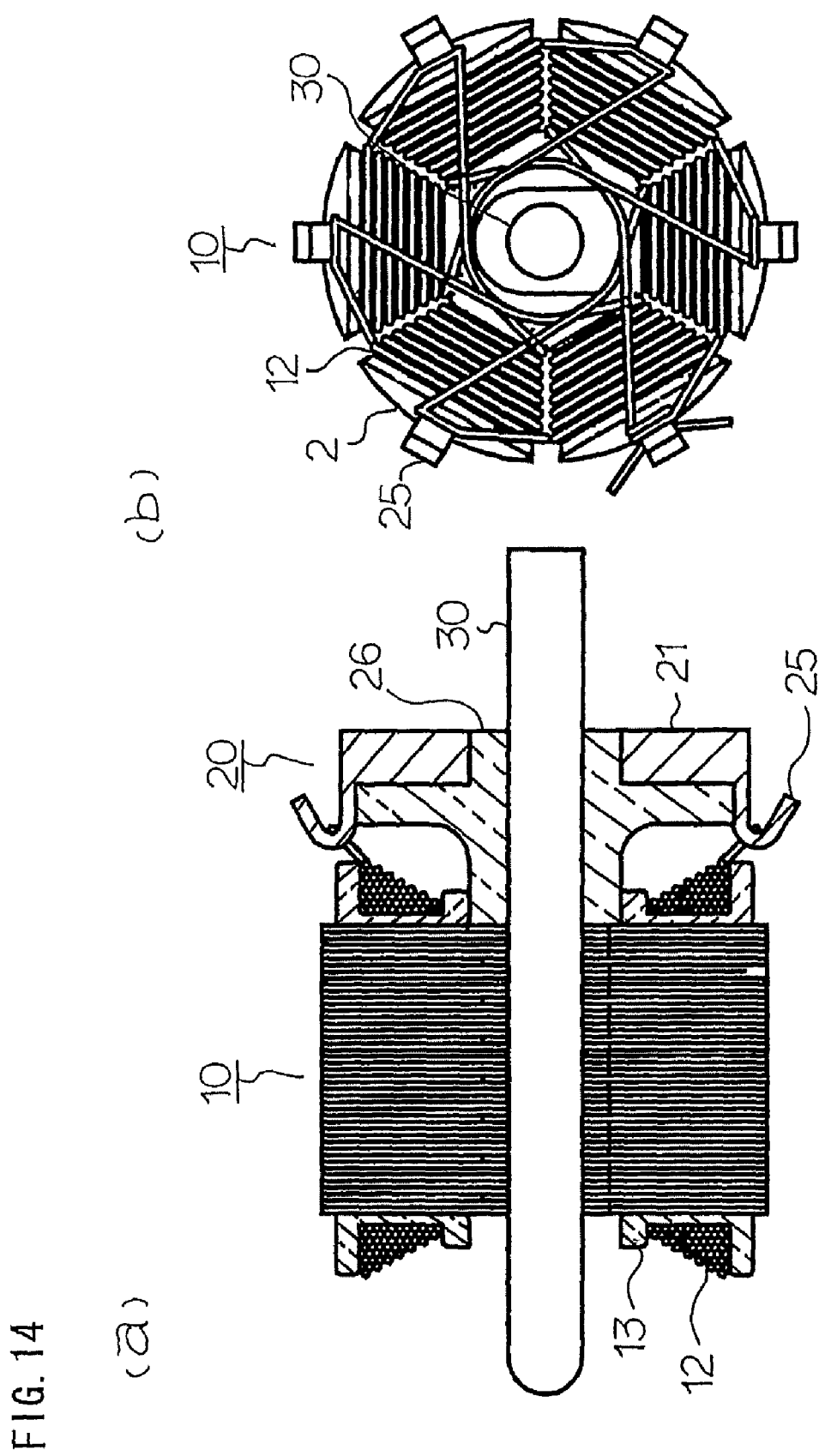
FIG. 14 is a cross-sectional front view (a) associated with a side view (b) showing the winding and assembly processes of the armature of the rotary motor according to the first embodiment of this invention.
Figure 15:
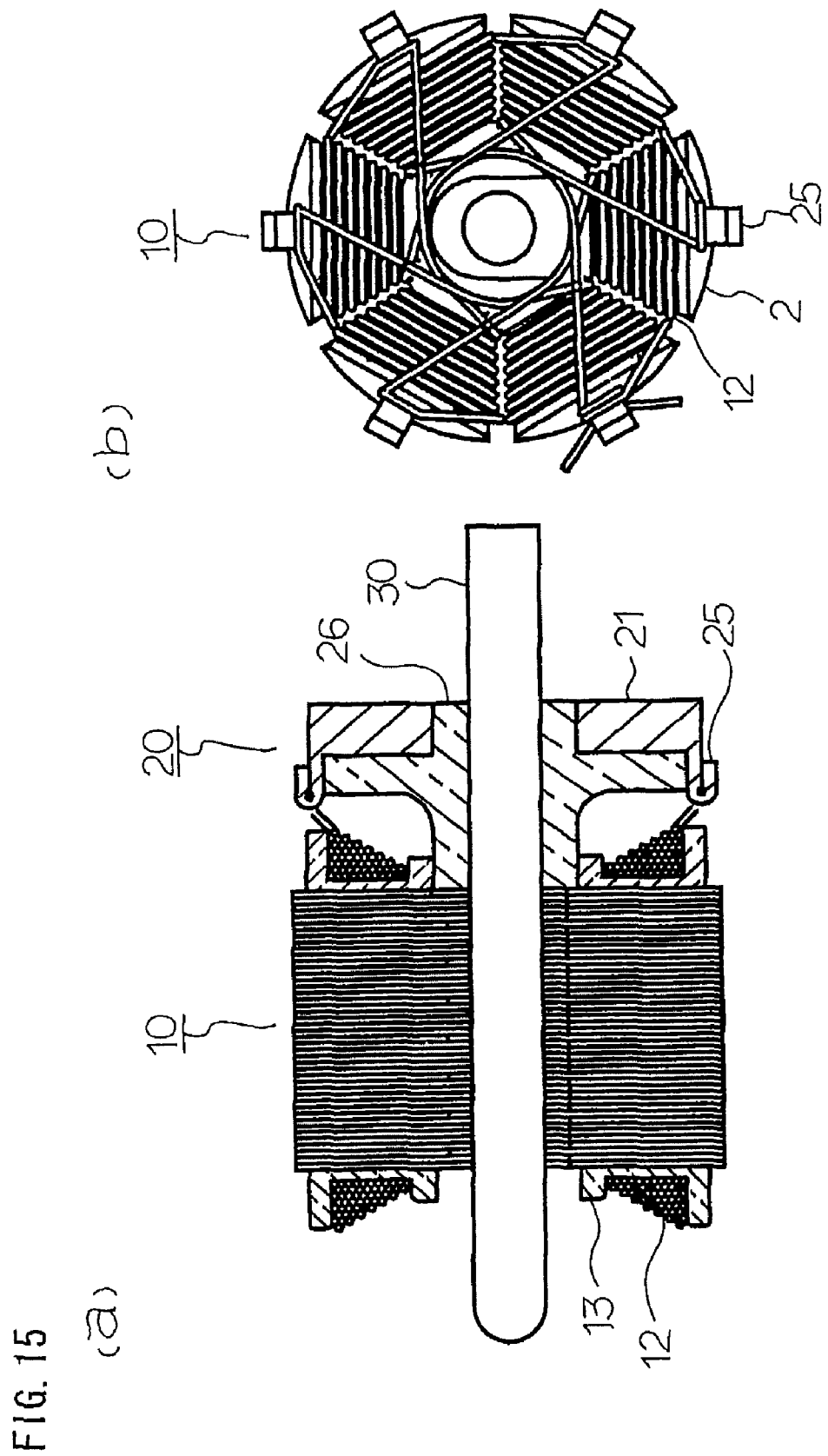
FIG. 15 is a cross-sectional front view (a) associated with a side view (b) showing the winding and assembly processes of the armature of the rotary motor according to the first embodiment of this invention.
Figure 16:
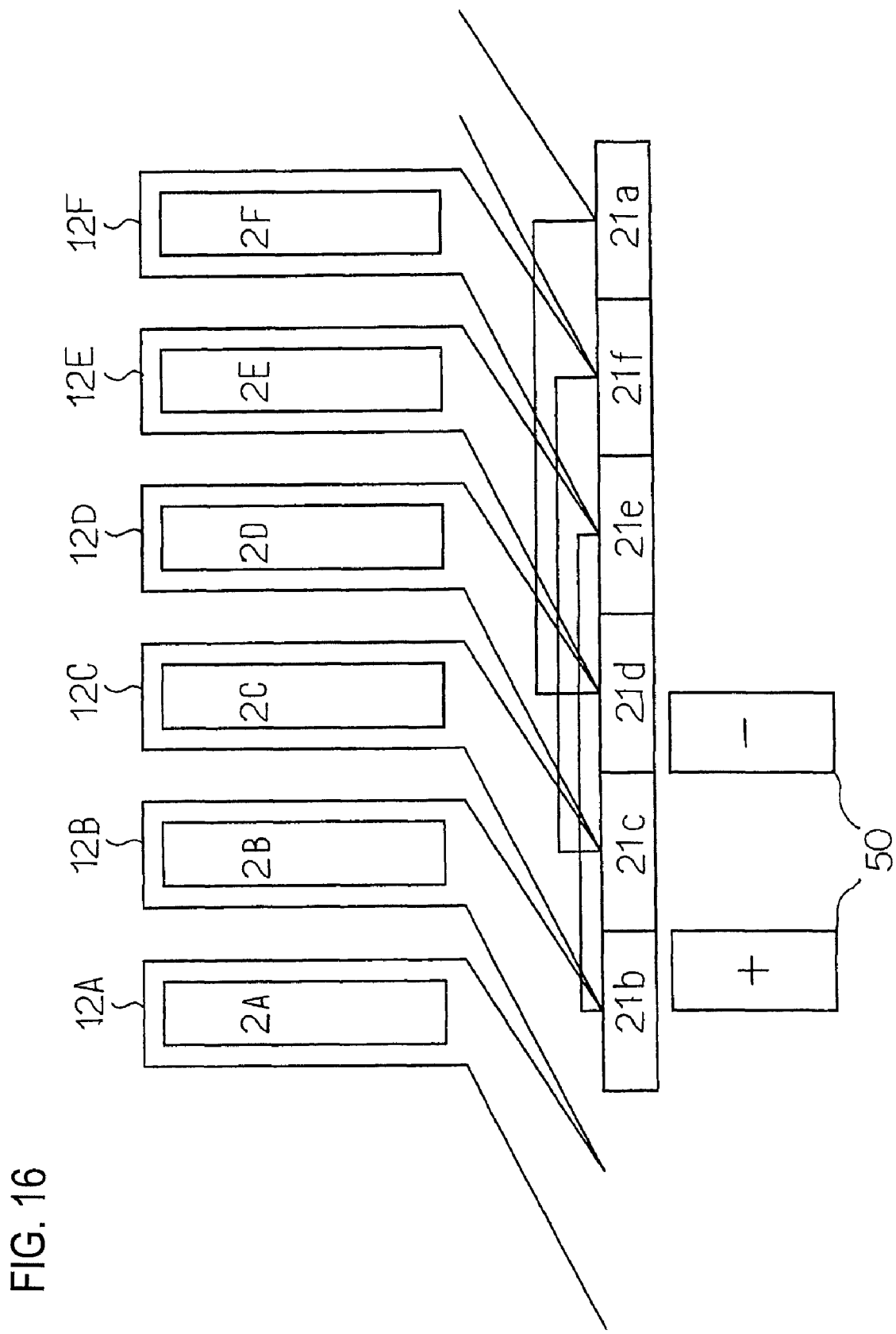
FIG. 16 is a connection diagram of coils connected to the armature core and a commutator according to the first embodiment of this invention.
Figure 17:
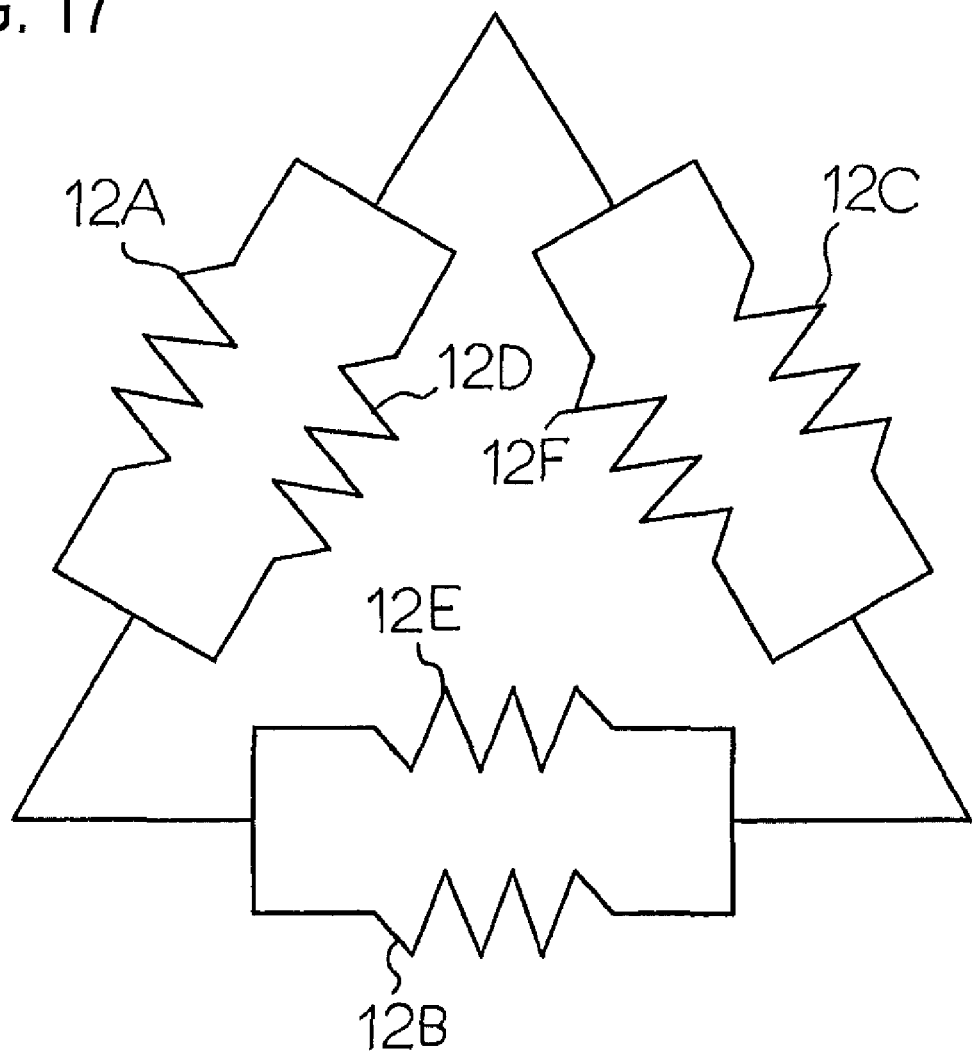
FIG. 17 is a connection diagram of the coils connected to the armature core and the commutator according to the first embodiment of this invention.
Figure 18A:
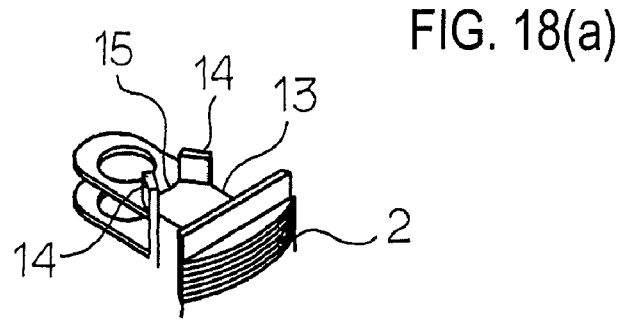
FIG. 18 is a perspective view showing the structure of insulators to be mounted on an armature core according to a second embodiment of the present invention.
Figure 18B:
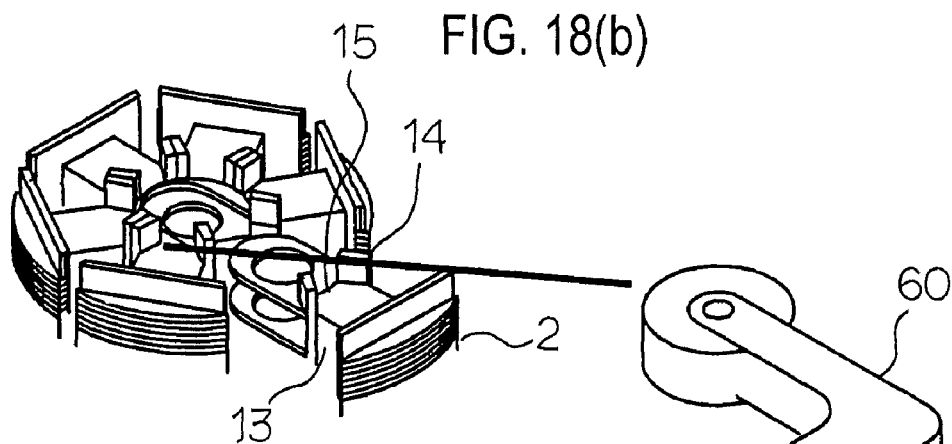
Figure 18C:
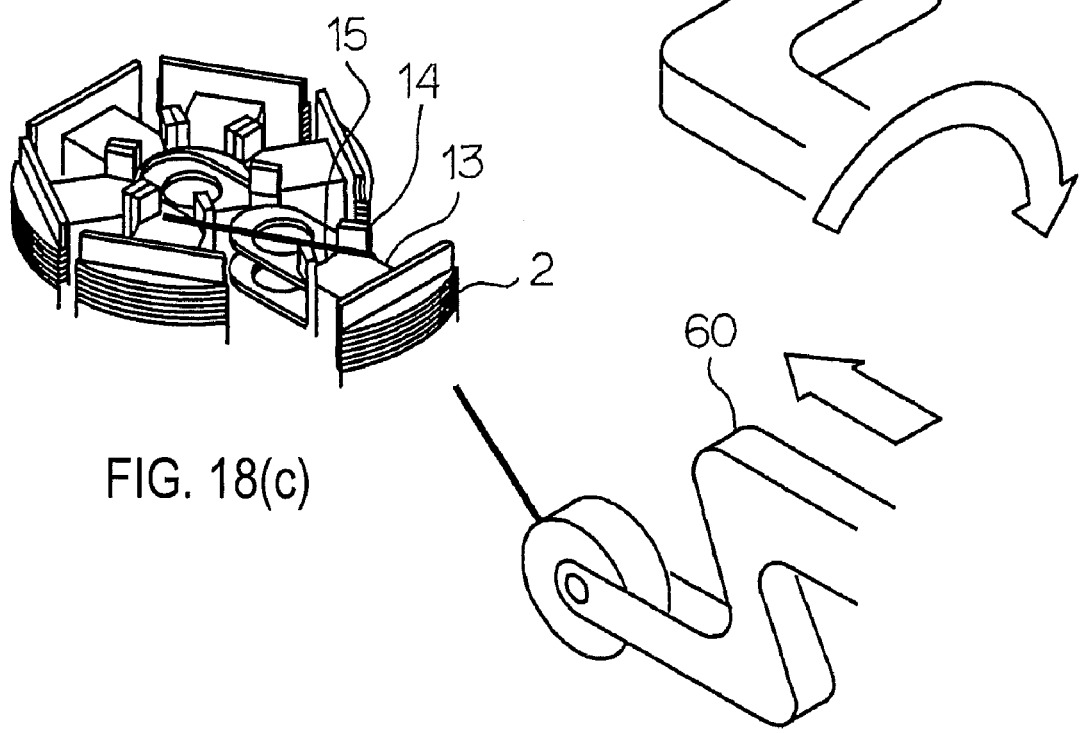
Figure 19:
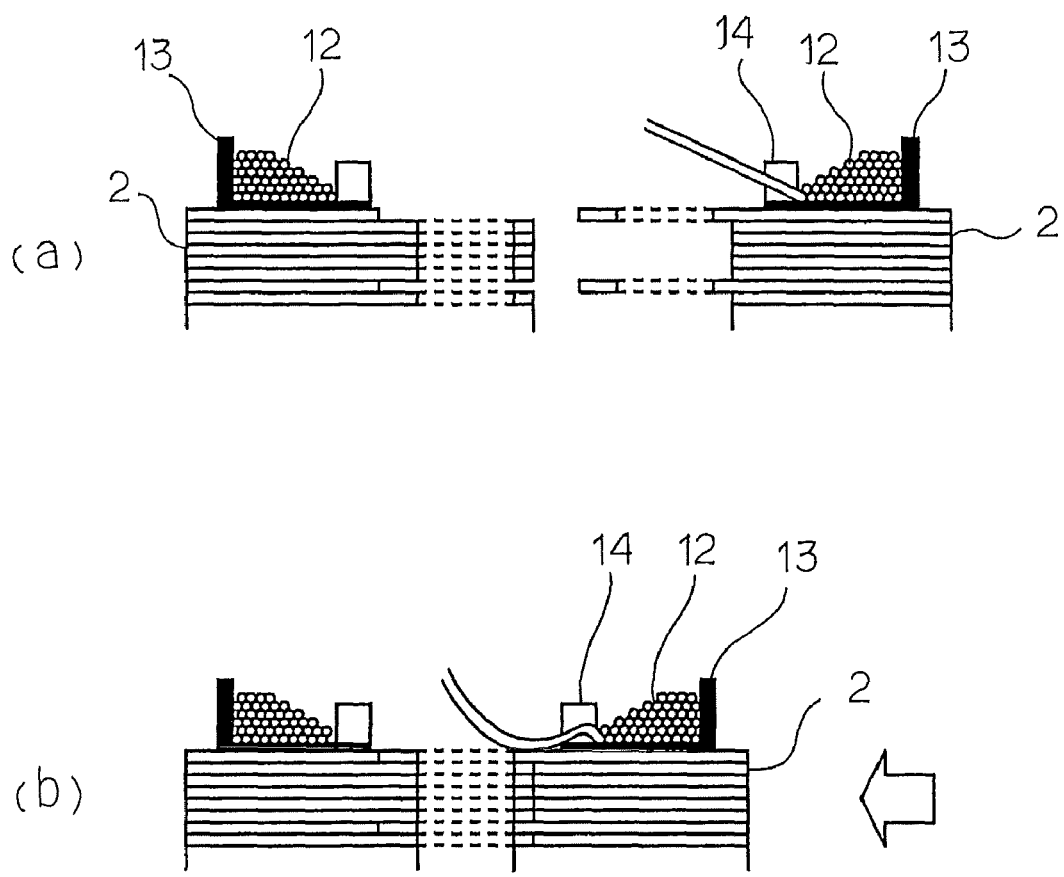
FIG. 19 is a diagram showing a condition in which a winding conductor passed through a guiding groove of the insulator slackens and goes into contact with an exposed portion of the core one of which magnetic tooth members has been pulled out.
Figure 20:
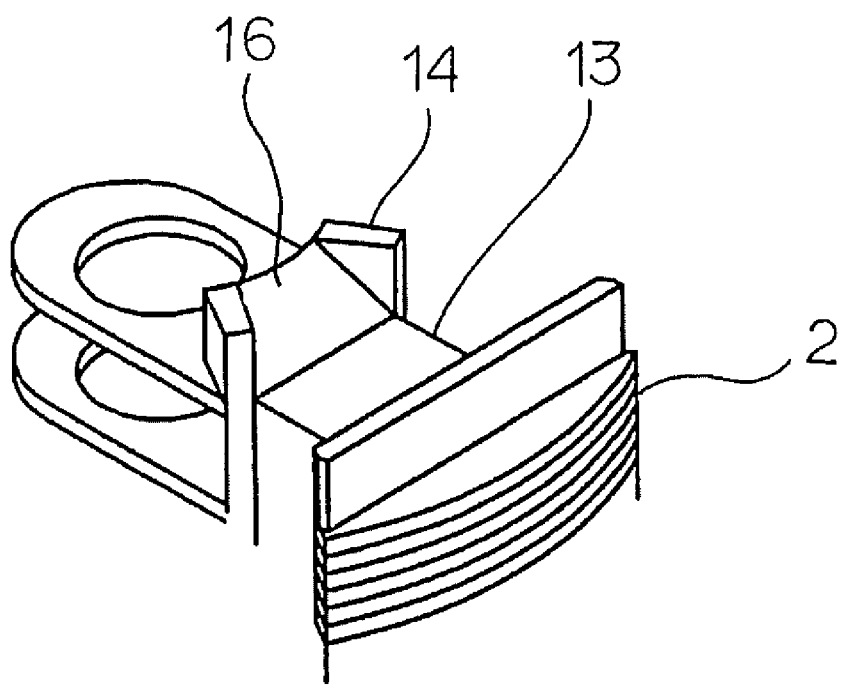
FIG. 20 is a perspective view showing the structure of an insulator fitted onto the armature core according to the second embodiment of the present invention.
Figure 21:
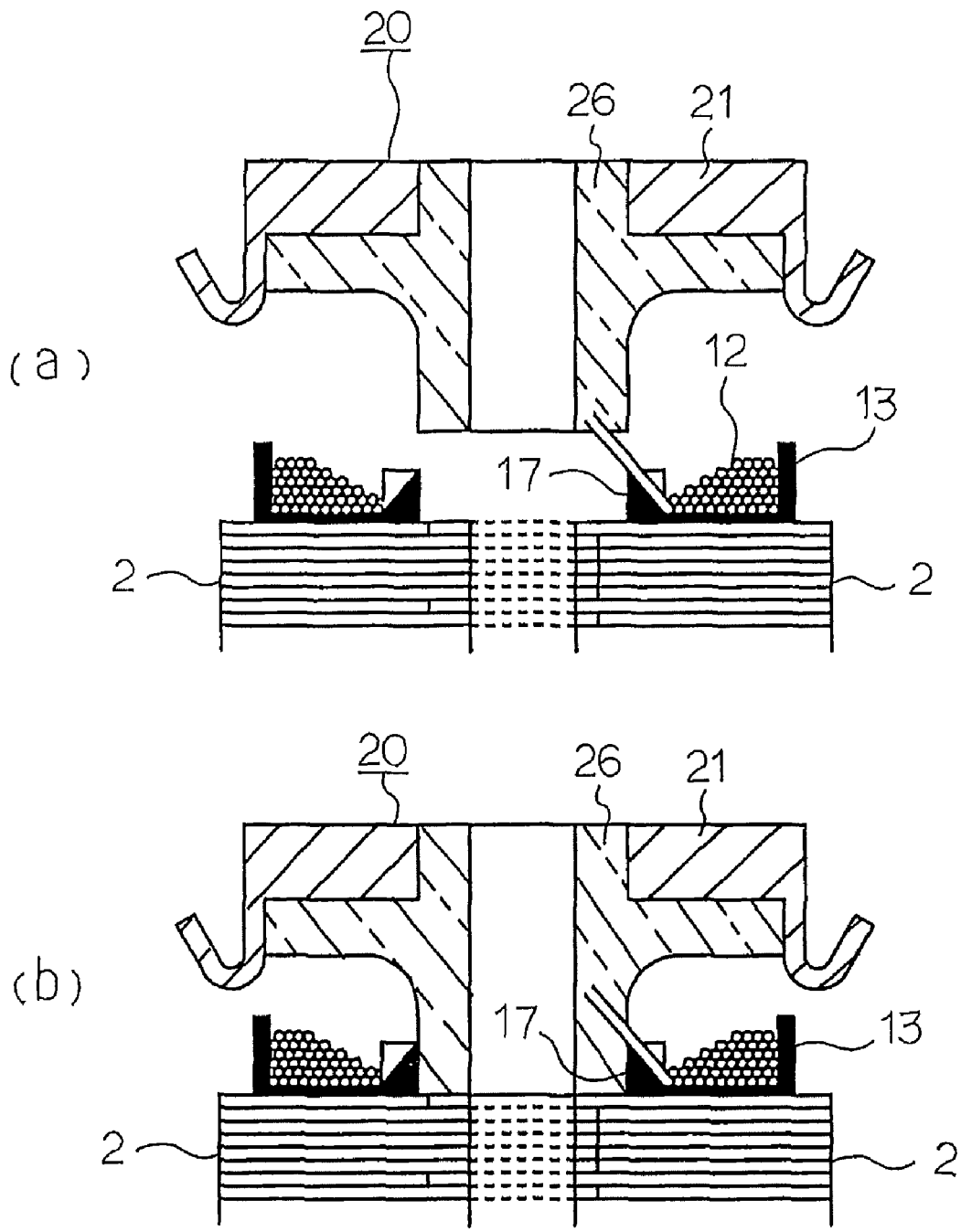
FIG. 21 is a cross-sectional side view showing a mating structure of the armature core and a commutator according to the second embodiment of the present invention.
Figure 22:
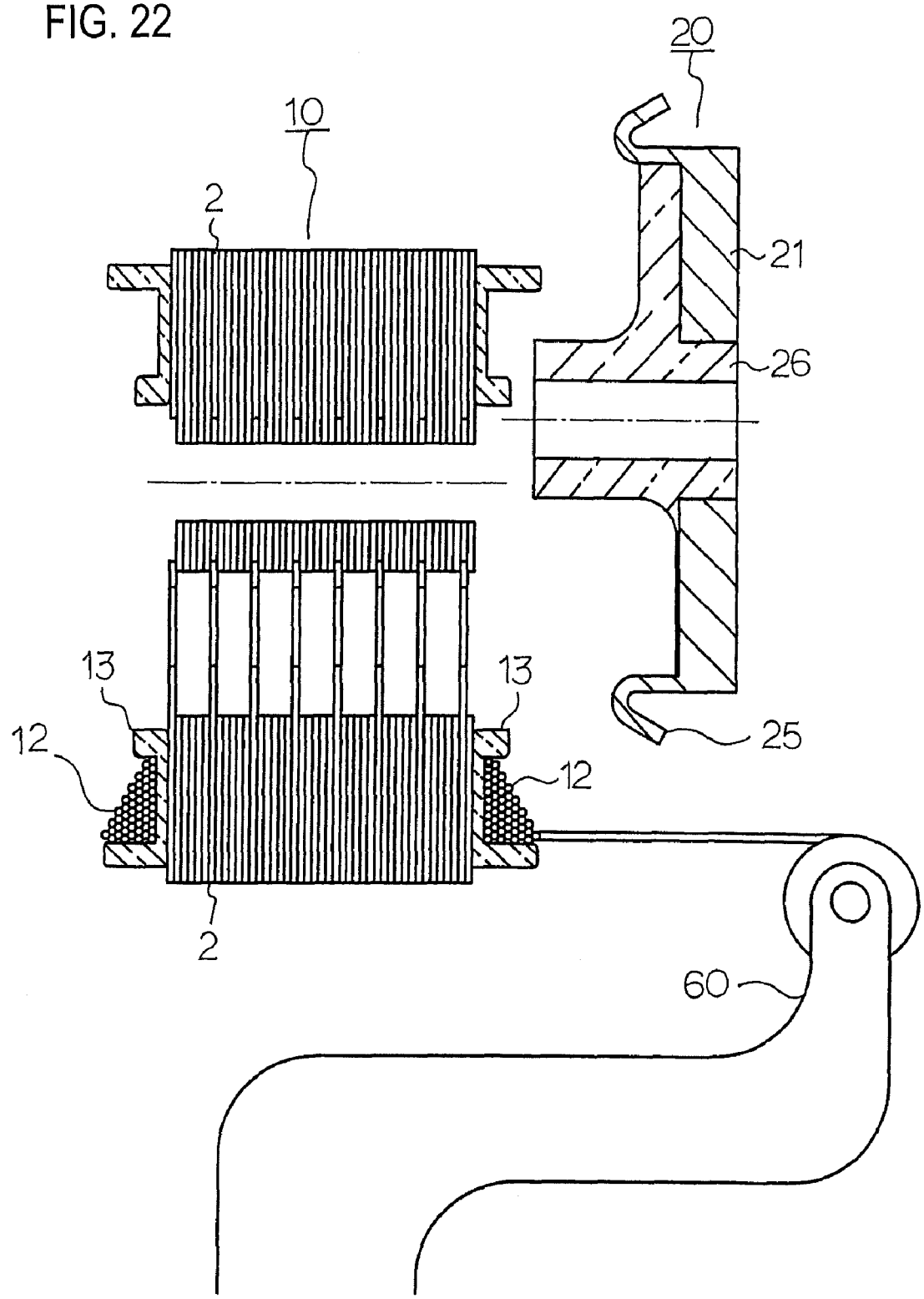
FIG. 22 is a cross-sectional side view showing a conductor winding process of an armature core according to a third embodiment of the present invention.
Figure 23:
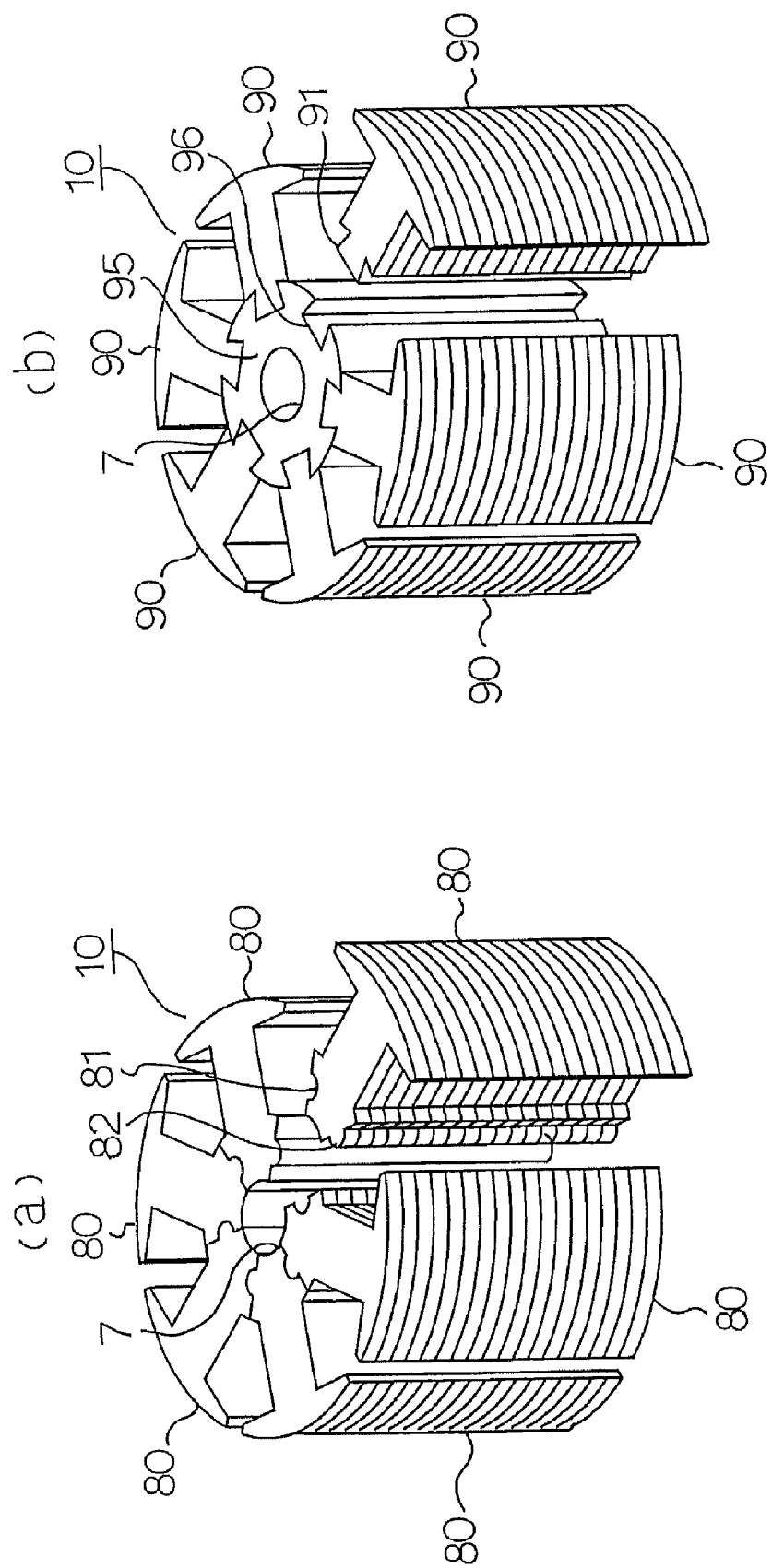
FIG. 23 is a perspective view showing the structure of an armature core according to a fourth embodiment of the present invention.

2 Magnetic tooth member
3 Magnetic tooth
4 End face
5 Basal part
6 First sheet element
7 Through hole
8 Second sheet element
9 Overlapping part
10 Armature core
12 Concentrated-winding type coil
13 Insulator
14 Projecting part
15 Guiding groove
16 Slope
17 Curved inner surface
20 Commutator
21 Segment
25 Connecting terminal
26 Boss portion
30 Rotary shaft
40 Stator
41 Permanent magnet
50 Brush
60 Winding machine
80, 90 Magnetic tooth members

The invention claimed is:
1. A method of manufacturing a rotary motor, said method comprising:
a step of winding a conductor line on an armature core by sequentially repeating:
a first step of pulling out one of magnetic tooth members of said armature core in a radial direction, said armature core being splittable into said individual mag- netic tooth members, and forming a concentrated-winding type coil on said one magnetic tooth member;
   a second step of pushing back said one magnetic tooth member into position and connecting an end portion of said concentrated-winding type coil to a connecting terminal of a commutator which has the same number of segments as the number of said magnetic tooth members; and
   a third step of winding the conductor line connected to the connecting terminal of said segment on another of said magnetic tooth members adjacent to said one magnetic tooth member to form another concentrated-winding type coil; and
a step of relatively turning said armature core and said commutator by a specific angle to shape the conductor line interconnecting the end portion of said concentrated-winding type coil on each of said magnetic tooth members and the connecting terminal of said segment generally into a straight line and fixing a rotary shaft to said armature core and said commutator.

2. The method of manufacturing a rotary motor as recited in claim 1, wherein the conductor line is wound on said armature core with a central axis of said commutator and that of said armature core arranged in a line.

3. The method of manufacturing a rotary motor as recited in claim 1, wherein the conductor line is wound on said armature core with a central axis of said commutator offset from that of said armature core in a direction opposite to said magnetic tooth member on which the conductor line is currently wound.

* * * * *